(12) United States Patent
Rossier et al.

(10) Patent No.: US 7,584,145 B2
(45) Date of Patent: Sep. 1, 2009

(54) SYSTEM AND METHOD FOR PROVIDING PRICE VALIDATION FOR MARKET MAKERS IN OVER THE COUNTER MARKETS

(75) Inventors: Romain Rossier, San Francisco, CA (US); David Vinh Lu, Santa Clara, CA (US); Patrick William Howard, Hoboken, NJ (US); Sean Michael Gilman, Rye, NY (US); Cary David Rosenwald, New York, NY (US); Richard Hartheimer, Morris Plains, NJ (US)

(73) Assignee: Currenex, Inc., New York, NY (US)

( * ) Notice: Subject to any disclaimer, the term of this patent is extended or adjusted under 35 U.S.C. 154(b) by 288 days.

(21) Appl. No.: 11/585,248

(22) Filed: Oct. 24, 2006

(65) Prior Publication Data

US 2008/0097890 A1    Apr. 24, 2008

(51) Int. Cl.
*G06Q 40/00* (2006.01)
(52) U.S. Cl. .......................................... 705/37; 705/38
(58) Field of Classification Search ............. 705/37–38
See application file for complete search history.

(56) References Cited

U.S. PATENT DOCUMENTS

| | | | |
|---|---|---|---|
| 5,375,055 A | 12/1994 | Togher et al. | |
| 6,014,627 A | 1/2000 | Togher et al. | |
| 6,108,639 A | 8/2000 | Walker et al. | |
| 6,493,682 B1 | 12/2002 | Horrigan et al. | |
| 6,944,599 B1 | 9/2005 | Vogel et al. | |
| 6,985,883 B1 | 1/2006 | Togher et al. | |
| 6,996,541 B2 | 2/2006 | Togher et al. | |
| 7,003,488 B2 | 2/2006 | Dunne | |
| 7,024,386 B1 | 4/2006 | Mills et al. | |
| 2006/0173693 A1* | 8/2006 | Arazi et al. | 705/1 |

* cited by examiner

*Primary Examiner*—Thu Thao Havan
(74) *Attorney, Agent, or Firm*—Andrews Kurth LLP

(57) ABSTRACT

A system and method provide price validation for market makers in over the counter (OTC) markets. Specifically, the system compares a new or existing price provided by a market maker with a base rate. If the unilateral difference is less than or equal to a configurable tolerance, the price may be added to validated rates. The unilateral difference is an amount that the new bid source rate is greater than the bid base rate or an amount that the new offer source rate is less than the offer base rate. On the other hand, if the difference is more than the tolerance, the price may be ignored or removed by the system. As a result, the system provides protection against trading on invalid off-market rates or stale rates that is caused by system latency or other types of temporary anomalies.

22 Claims, 3 Drawing Sheets

SYSTEM AND METHOD FOR PROVIDING PRICE VALIDATION FOR MARKET MAKERS IN OVER THE COUNTER MARKETS

TECHNICAL FIELD

The technical field relates to computer-based systems for trading financial instruments, and, in particular, to a system and method for providing price validation for market makers in over the counter (OTC) markets.

BACKGROUND

Financial or commodities instruments may be traded in government regulated exchanges and cleared through regulated clearing monopolies such as the National Securities Clearing Corporation (NSCC) (for equities), the Options Clearing Corporation (OCC) (for equity options), or the Government Securities Clearing Corporation (GSCC) (for treasury bonds). In contrast, instruments for which no central clearing solution exists are traded "OTC" or "Over the counter." OTC products are traded and settled through multiple independent venues, introducing settlement risk and therefore affecting the marketability of prices as a function of the credit worthiness of the participants. Because settlement risk varies by participant, different participants have access to different rates in an OTC market. For example, most debt instruments are traded OTC with investment banks that make markets in specific issues. If a customer wants to buy or sell a bond, he or she will contact the bank that makes a market in that bond and ask for quotes. Many instruments, including forwards, swaps, currencies, and other types of derivatives are also traded OTC. In these OTC markets, large financial institutions typically serve as dealers, i.e., market makers. In an OTC market, a fair price is typically defined by what a willing buyer will pay and what a willing seller will accept.

A market maker typically provides a pair of prices to its customers, i.e., bid and offer prices. The bid price is the price the market maker is willing to buy from a customer, whereas the offer price is the price the market maker is willing to sell to a customer. The bid price is typically lower than the offer price, providing a spread, i.e., profit for the market maker.

In an OTC market, a market maker may trade instruments traditionally, e.g., by phone, or electronically, e.g., using a service provider. A service provider, such as Currenex (www.currenex.com) or EBS (www.ebs.com), typically provides one or more electronic communications networks (ECN), i.e., trading exchange platforms, for market makers to trade instruments electronically in an OTC market. A market maker may deal in multiple platforms. Likewise, a service provider may support multiple market makers through multiple liquidity pools (also referred to as exchange platforms, exchanges, exchange markets).

Because it is difficult to continually assess the market price, a market maker can inadvertently provide an off-market price, e.g., a bid price that is too high or an offer price that is too low, which may result in significant loses for the market maker. Similarly, since the market price changes constantly for a given instrument based on prices provided by other market makers, an existing price may become invalid from the market price in time.

Currently, service providers do not validate the bid and offer prices for the market makers and do not notify the market makers of an invalid off-market price. Trading on such invalid prices may result in significant loses for the market makers. For example, if a market maker offers to sell one million euros (EUR) and receive dollars (USD) at rate of 1.1724 and the average of offer prices has jumped to 1.1728, the market maker may lose a significant amount of money when the 1.1724 offer price was not updated and a customer takes the low 1.1724 offer price.

SUMMARY

A computer implemented method for providing price validation for market makers in over the counter (OTC) markets includes accepting raw rates from price engines in a plurality of market makers. The raw rates are bid and offer prices provided by the plurality of market makers. The method further includes aggregating the raw rates provided by the plurality of market makers, inputting the raw rates to a price validation module, and calculating a bid base rate and an offer base rate based on the raw rates provided by the plurality of market makers. The method further includes comparing a new bid or offer source rate provided by a first market maker with the corresponding bid or offer base rate. If a unilateral difference between the new bid or offer source rate and the corresponding bid or offer base rate is less than or equal to a first configurable tolerance, the method adds the new bid or offer source rate to a group of one or more validated rates and inputs the validated rates into a matching engine. The unilateral difference is an amount that the new bid source rate is greater than the bid base rate or an amount that the new offer source rate is less than the offer base rate. On the other hand, if the unilateral difference is more than the tolerance, the price may be ignored or removed. The matching engine matches the validated rates with orders from customers.

A system for providing price validation for market makers in OTC markets includes a price integration layer that accepts raw rates from price engines in a plurality of market makers and aggregates the raw rates provided by the plurality of market makers. The raw rates are bid and offer prices provided by the plurality of market makers. The system further includes a price validation module that accepts the aggregated rates from the price integration layer and calculates a bid base rate and an offer base rate based on the aggregated rates. The price validation module compares a new bid or offer source rate provided by a first market maker with the corresponding bid or offer base rate. If a unilateral difference between the new bid or offer source rate and the corresponding bid or offer base rate is less than or equal to a first configurable tolerance, the price validation module adds the new bid or offer source rate to a group of one or more validated rates. The unilateral difference is an amount that the new bid source rate is greater than the bid base rate or an amount that the new offer source rate is less than the offer base rate. On the other hand, if the unilateral difference is more than the tolerance, the price may be ignored or removed by the system. The system further includes a matching engine that accepts the validated rates and matches the validated rates with orders from customers and a network connecting the price validation module with the price engines.

A computer readable medium provides instructions for providing price validation for market makers in OTC markets. The instructions includes accepting raw rates from price engines in a plurality of market makers. The raw rates are bid and offer prices provided by the plurality of market makers. The instructions further includes aggregating the raw rates provided by the plurality of market makers, inputting the raw rates to a price validation module, and calculating a bid and an offer base rate based on the raw rates provided by the plurality of market makers. The instructions further include comparing a new bid or offer source rate provided by a first market maker with the corresponding bid or offer base rate. If a unilateral difference between the new bid or offer source rate and the corresponding bid or offer base rate is less than or equal to a first configurable tolerance, the new bid or offer source rate are added to a group of one or more validated rates and the validated rates are input into a matching engine. The unilateral difference is an amount that the new bid source rate is greater than the bid base rate or an amount that the new offer source rate is less than the offer base rate. On the other hand, if the difference is more than the unilateral tolerance, the price may be ignored or removed. The matching engine matches the validated rates with orders from customers.

DESCRIPTION OF THE DRAWINGS

The exemplary embodiments of the system and method for providing price validation for market makers in over the counter (OTC) markets will be described in detail with reference to the following figures, in which like numerals refer to like elements, and wherein.

DETAILED DESCRIPTION

A system and method provide price validation for market makers in over the counter (OTC) markets. Specifically, the system compares a new or previously supplied open price provided by a market maker with the appropriate base rate. If the unilateral difference is less than or equal to a configurable tolerance, the price may be added to validated rates. The unilateral difference is the amount that the new or open bid rate is greater than the bid base rate or the amount that the new or open offer rate is less than the offer base rate. On the other hand, if the unilateral difference is more than the tolerance, the price may be ignored or removed by the system. As a result, the system provides protection against trading on invalid off-market rates or stale rates that is caused by system latency or other types of temporary anomalies.

The system and method are described in the context of OTC markets for illustration purposes only. One skilled in the art will appreciate that the system and method can be applied to any asset class.

Figure 1:
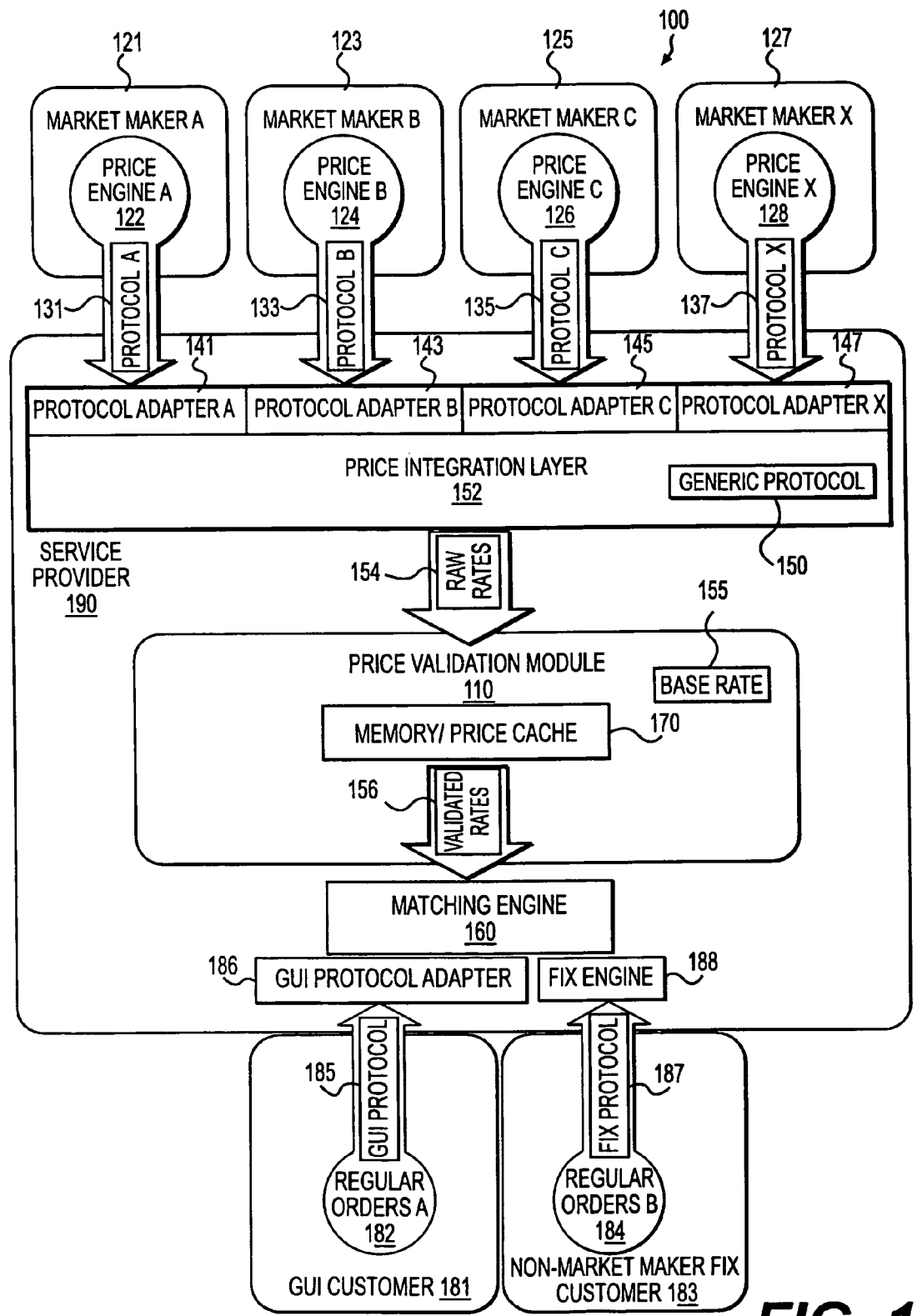
FIG. 1 illustrates an embodiment of a system that provides price validation for market makers in OTC markets.

FIG. 1 illustrates an embodiment of a system 100 that provides price validation for market makers in OTC markets. As noted above, a service provider 190 typically provides one or more electronic communications networks (ECN) (also referred to as trading exchange platforms) for market makers 121, 123, 125, 127 to trade instruments electronically in an OTC market. The market makers 121, 123, 125, 127 typically use price engines 122, 124, 126, 128 to provide bid and offer prices, i.e., bid and offer rates, electronically using various protocols 131, 133, 135, 137. The service provider 190 may have protocol adapters 141, 143, 145, 147 for each protocol 131, 133, 135, 137 to convert prices or rates offered in a market maker's specific protocol to a generic protocol 150 in a price integration layer 152. The prices or rates from multiple market makers 121, 123, 125, 127 may be aggregated in the price integration layer 152.

The system 100 includes a price validation module 110 that accepts bid and offer prices, i.e., raw rates 154, provided by different market makers 121, 123, 125, 127. The price validation module 110 calculates base rates 155 based on the raw rates 154 from various liquidity sources, i.e., price engines 122, 124, 126, 128. For example, the base rates 155 may include an average of the bid prices and an average of the offer prices provided by the various liquidity sources. The price validation module 110 then validates the raw rates 154 by comparing these appropriate (bid or offer) raw rates 154 to the appropriate (bid or offer) base rates 155. After validation, these raw rates 154 become validated rates, also referred to as clean rates 156. The validated rates 156 may be saved in a memory, i.e., price cache 170. The memory 170 may include an order book (not shown) containing all the validated current bid and offer prices provide by the market makers 121, 123 125, 127.

The validated rates 156 are then sent to a matching engine 160. The matching engine 160 matches the validated rates 156 with regular orders 182, 184 from customers 181, 183. The customers may be, e.g., a graphic user interface (GUI) customer 181 or a non-market maker financial information exchange (FIX) customer 183. The customers 181, 183 typically provide regular orders 182, 184 to the matching engine 160 using different protocols, such as a GUI protocol 185 or a FIX protocol 187. The orders 182, 184 may be converted to a generic protocol (not shown) using, e.g., a GUI protocol adapter 186 or a FIX engine 188, respectively.

The matching engine 160 may use a memory device (not shown) to store actual trading prices during a specified period, e.g., past 10 hours. Both the price validation module 110 and the matching engine 160 may be provided by the service provider 190. The price validation module 110 may be a separate module from the matching engine 160. Alternatively, the price validation module 110 may be included in the matching engine 160.

The price validation module 110 and the matching engine 160 may be connected, through a network 318 (shown in FIG. 3), e.g., the Internet, to remote computers operated by multiple OTC market makers 121, 123, 125, 127 and the customers 181, 183.

Figure 2:
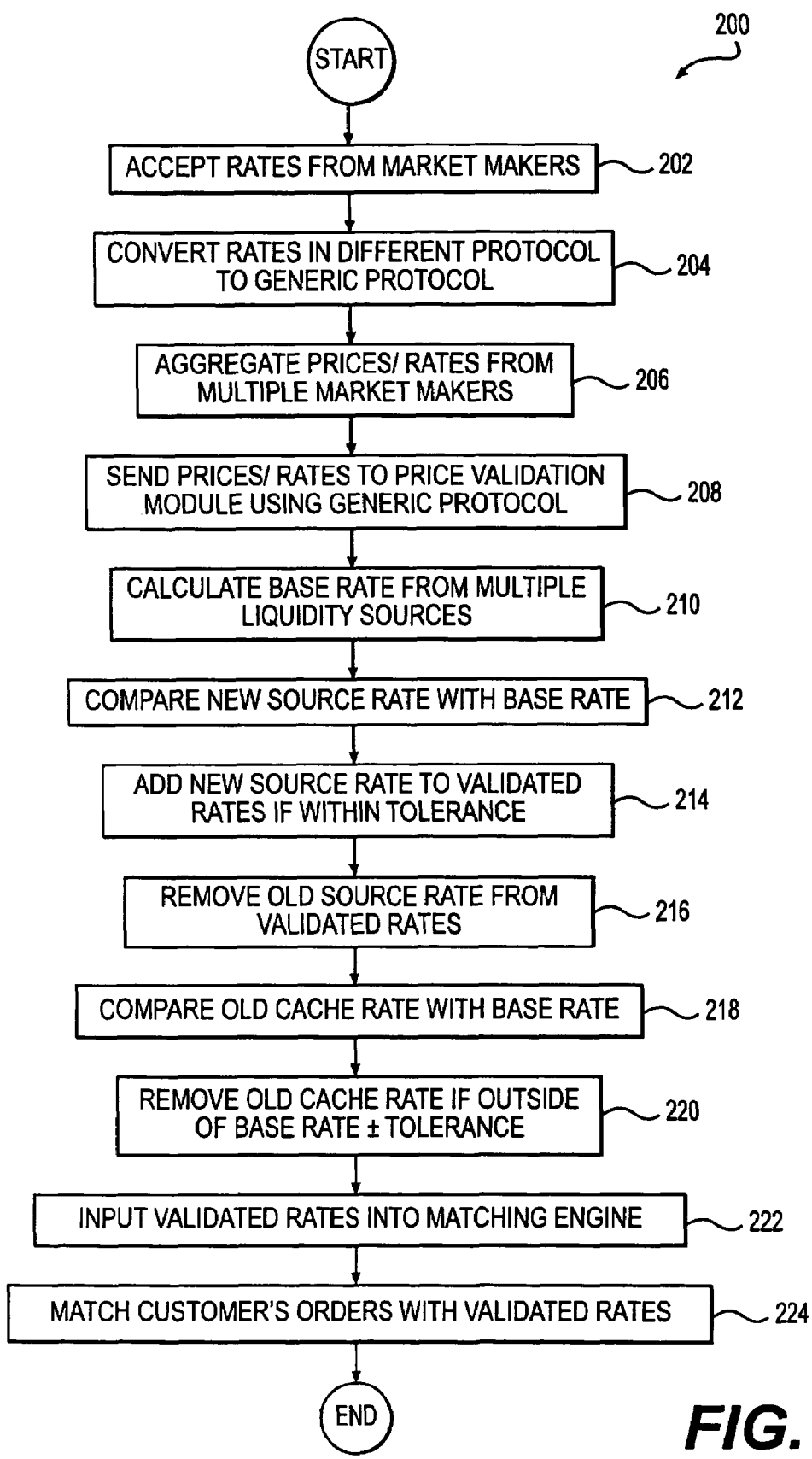
FIG. 2 is a flow chart illustrating an embodiment of a method for providing price validation for market makers in OTC markets.

FIG. 2 is a flow chart illustrating an embodiment of a method 200 for providing price validation for market makers in OTC markets. Each liquidity source, i.e., price engine at each market maker, may have different bid and offer prices at any instant. Each market maker 121, 123, 125, 127 may use a different protocol 131, 133, 135, 137 to send these bid and offer prices, also referred to as raw rates 154, to the service provider 190, which accepts the raw rates 154 (block 202). The service provider 190 may use protocol adapters 141, 143, 145, 147 to convert the raw rates 154 in a market maker's specific protocol 131, 133, 135, 137 to a generic protocol 150 at the price integration layer 152 (block 204). The raw rates 154 may be aggregated (block 206) and input into the price validation module 110 using the generic protocol 150 (block 208).

The price validation module 110 then calculates a pair of (bid and offer) base rates 155 for the OTC market based on, for example, the average bid price and the average offer price provided by a selected number of market makers 121, 123, 125, 127 (block 210). For example, the base rates 155 may be calculated based on the average bid prices and the average offer prices from ten market makers connected to the service provider 190. Alternatively, for a given market maker, the base rates 155 may be calculated based on the actual trading prices that took place during a certain period, e.g., past 10 minutes. As noted above, the actual trading prices may be recorded by the matching engine 160 and provided to the price validation module 110. One skilled in the art will appreciate that different calculation methods may be utilized by the price validation module 110 to derive the base rates 155. It is also possible to calculate a single base rate resulting from a calculation from both the bid and offer raw rates, where both the bid and offer base rates are set to a single value.

The price validation module 110 may constantly validate new executable prices, also referred to as new source rates, provided by the market makers 121, 123, 125, 127 by comparing the new source rates with the base rates 155 (block 212). If the unilateral difference between a new source rate and the corresponding base rate 155 is less than or equal to a configurable tolerance, e.g., T pips, the price validation module 110 may add the new source rate to validated rates 156 (block 214). The unilateral difference is an amount that the new bid source rate is greater than the bid base rate or an amount that the new offer source rate is less than the offer base rate. A pip is typically the minimum fluctuation or smallest increment of price movement. The price validation module 110 may optionally remove any other open prices, also referred to as old source rates from the validated rates 156 for the same market maker because the market maker may be inactive (block 216). The tolerance may be configurable by each trading instrument and by time zone, because in a 24 hour market there are times in the day when liquidity is thin, which causes market rates to become wider. For example, if the bid base rate is 1.1724 and the tolerance is 0.0003, a new bid price of greater than 1.1727 (1.1724+0.0003) will be ignored by the system 100. When a particular price is removed or filtered from the system 100, the system 100 may send out an alert message to the market maker providing the price.

The base rates 155 may change in real-time as a result of other market makers modifying their bid and offer prices or as a result of executed orders. Therefore, an existing price that is valid at some period may become invalid in time as the base rates 155 change. The price validation module 110 may validate existing bid and offer prices for potential stale prices for each market maker 121, 123, 125, 127. Specifically, the price validation module 110 compares the existing prices saved in the memory 170, also referred to as old cache rates, with the appropriate base rate 155 (block 218). If the unilateral difference between an old cache rate and the appropriate base rate 155 is more than a configurable tolerance, the old cache rate may be removed by the system 100 from the validated rates 156 (block 220). The unilateral difference is the amount that the old bid cache rate is greater than the bid base rate or the amount that the old offer cache rate is less than the offer base rate. The tolerance for old cache rates may be the same as the tolerance for new source rates.

Validated rates, also referred to as clean rates 156, may then be input into the matching engine 160 (block 222). The matching engine 160 matches customers' regular orders 182, 184 with the validated rates 156 provided by the market makers.

Figure 3:
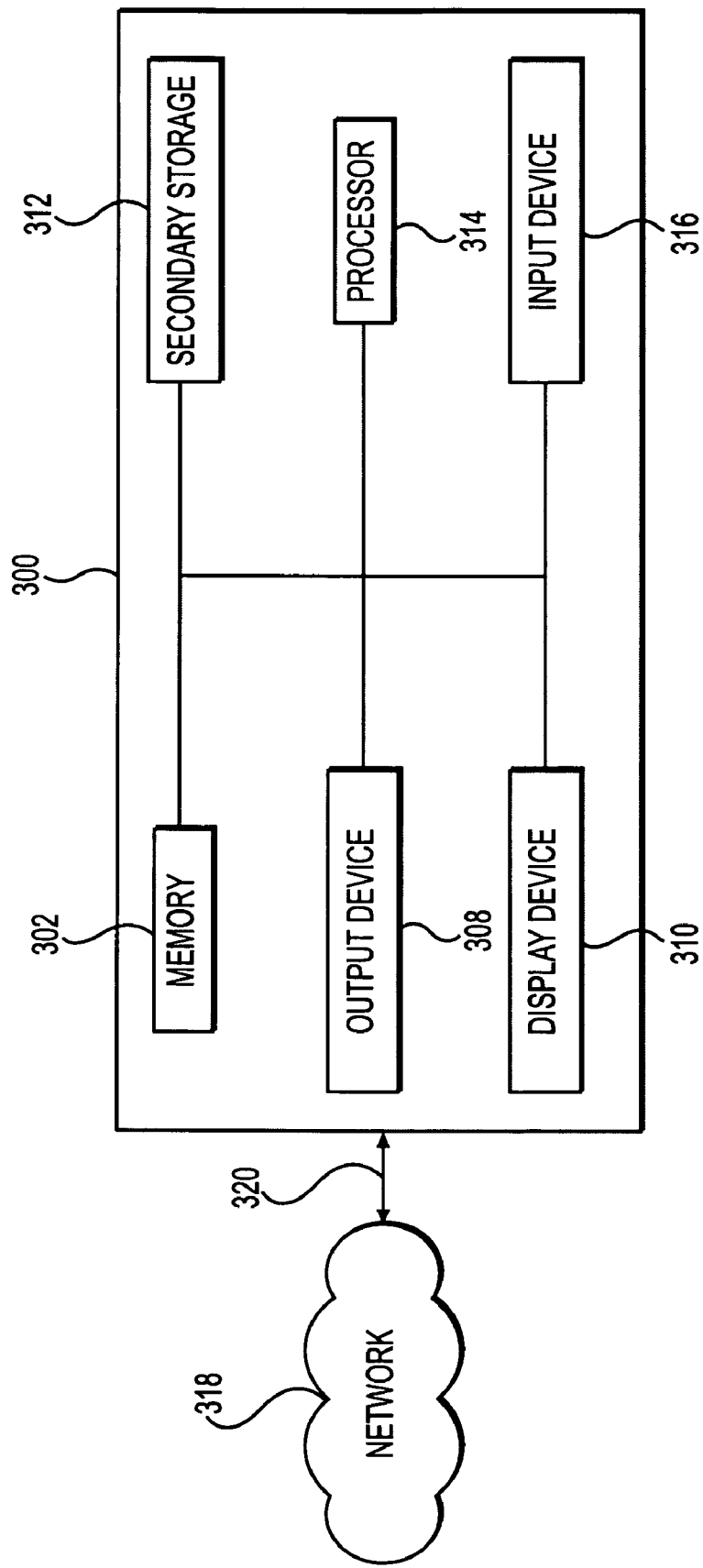
FIG. 3 illustrates exemplary hardware components of a computer that may be used in connection with an exemplary method for price validation for market makers in OTC markets.

FIG. 3 illustrates exemplary hardware components of a computer 1700 that may be used in connection with the method for providing price validation for market makers in OTC markets. The computer 1700 includes a connection 320 with a network 318 such as the Internet or other type of computer or telephone network. For example, the network 318 connects the price validation module 110 with the price engines 122, 124, 126, 128 from different market makers 121, 123, 125, 127. The computer 300 typically includes a memory 302, a secondary storage device 312, a processor 314, an input device 316, a display device 310, and an output device 308. For example, the memory 302 may include the memory 170 in the price validation module 110.

The memory 302 may include random access memory (RAM) or similar types of memory. The secondary storage device 312 may include a hard disk drive, floppy disk drive, CD-ROM drive, or other types of non-volatile data storage, and may correspond with various databases or other resources. The processor 314 may execute instructions to perform the method steps described herein. These instructions may be stored in the memory 302, the secondary storage 312, or received from the Internet or other network 318. The input device 316 may include any device for entering data into the computer 300, such as a keyboard, keypad, cursor-control device, touch-screen (possibly with a stylus), or microphone. The display device 310 may include any type of device for presenting visual image, such as, for example, a computer monitor, flat-screen display, or display panel. The output device 308 may include any type of device for presenting data in hard copy format, such as a printer, and other types of output devices including speakers or any device for providing data in audio form. The computer 300 can possibly include multiple input devices, output devices, and display devices.

Although the computer 300 is depicted with various components, one skilled in the art will appreciate that the computer 300 can contain additional or different components. In addition, although aspects of an implementation consistent with the method for providing price validation for market makers in OTC markets are described as being stored in memory, one skilled in the art will appreciate that these aspects can also be stored on or read from other types of computer program products or computer-readable media, such as secondary storage devices, including hard disks, floppy disks, or CD-ROM; a signal embodied in a carrier wave from the Internet or other network; or other forms of RAM or ROM. The computer-readable media may include instructions for controlling the computer 300 to perform a particular method.

While the system and method for price validation for market makers in OTC markets have been described in connection with an exemplary embodiment, those skilled in the art will understand that many modifications in light of these teachings are possible, and this application is intended to cover variations thereof.

What is claimed is:

1. A computer implemented method for providing price validation for market makers in over the counter (OTC) markets, comprising:

accepting raw rates from price engines in a plurality of market makers, wherein the raw rates are bid and offer prices provided by the plurality of market makers;

aggregating the raw rates provided by the plurality of market makers;

inputting the raw rates to a price validation module;

calculating a bid base rate and an offer base rate based on the raw rates provided by the plurality of market makers;

validating a new bid or offer source rate by comparing the new bid or offer source rate provided by a first market maker with the corresponding bid or offer base rate, wherein the new bid or offer source rate is valid when a unilateral difference between the new bid or offer source rate and the corresponding bid or offer base rate is less than or equal to a first configurable tolerance, and wherein the unilateral difference is an amount that the new bid source rate is greater than the bid base rate or an amount that the new offer source rate is less than the offer base rate;

adding the validated new source bid or offer rate to a group of one or more validated rates, and inputting the validated rates into a matching engine, wherein the matching engine matches the validated rates with orders from customers.

2. The method of claim 1, further comprising removing an old source rate provided by the first market maker from the validated rates.

3. The method of claim 1, further comprising sending an alert message to the first market maker if the new bid or offer source rate is not added to the validated rates.

4. The method of claim 1, further comprising:
comparing an old bid or offer cache rate provided by a second market maker with the corresponding bid or offer base rate, wherein the old bid or offer cache rate is stored in a memory of the price validation module; and
if a unilateral difference between the old bid or offer cache rate and the corresponding bid or offer base rate is more than a second configurable tolerance, removing the old cache bid or offer rate from the validated rates, wherein the unilateral difference is an amount that the old bid cache rate is greater than the bid base rate or an amount that the old offer cache rate is less than the offer base rate.

5. The method of claim 4, wherein the first configurable tolerance is the same as the second configurable tolerance.

6. The method of claim 4, further comprising sending an alert message to the second market maker if the old bid or offer cache rate is removed from the validated rates.

7. The method of claim 1, wherein the calculating step includes calculating the bid base rate and the offer base rate based on actual prices of trades that took place during a certain period, wherein the actual prices are stored in the matching engine.

8. The method of claim 1, wherein the calculating step includes calculating an average of bid and offer prices provided by the plurality of market makers.

9. The method of claim 1, further comprising converting the raw rates provided in different protocols to a generic protocol.

10. A system for providing price validation for market makers in over the counter (OTC) markets, comprising:
a price integration layer that accepts raw rates from price engines in a plurality of market makers and aggregates the raw rates provided by the plurality of market makers, wherein the raw rates are bid and offer prices provided by the plurality of market makers;
a price validation module that accepts the aggregated rates from the price integration layer, calculates a bid base rate and an offer base rate based on the aggregated rates, validates a new bid or offer source rate by comparing the new bid or offer source rate provided by a first market maker with the corresponding bid or offer base rate, and adds the validated new bid or offer source rate to a group of one or more validated rates, wherein the new bid or offer source rate is valid when a unilateral difference between the new bid or offer source rate and the corresponding bid or offer base rate is less than or equal to a first configurable tolerance, and wherein the unilateral difference is an amount that the new bid source rate is greater than the bid base rate or an amount that the new offer source rate is less than the offer base rate;
a matching engine that accepts the validated rates and matches the validated rates with orders from customers; and
a network connecting the price validation module with the price engines.

11. The system of claim 10, wherein the price validation module further removes an old source rate provided by the first market maker from the validated rates.

12. The system of claim 10, wherein the price validation module sends an alert message to the first market maker if the new bid or offer source rate is not added to the validated rates.

13. The system of claim 10, wherein the price validation module compares an old bid or offer cache rate provided by a second market maker with the corresponding bid or offer base rate, wherein the old bid or offer cache rate is stored in a memory of the price validation module, and wherein if a unilateral difference between the old bid or offer cache rate and the corresponding bid or offer base rate is more than a second configurable tolerance, the price validation module removes the old bid or offer cache rate from the validated rates, wherein the unilateral difference is an amount that the old bid cache rate is greater than the bid base rate or an amount that the old offer cache rate is less than the offer base rate.

14. The system of claim 13, wherein the first configurable tolerance is the same as the second configurable tolerance.

15. The system of claim 10, wherein the price validation module calculates the bid base rate and the offer base rate based on actual trading prices that took place during a certain period, and wherein the actual trading prices are stored in the matching engine.

16. The system of claim 10, wherein the price validation module calculates an average of bid and offer prices provided by the plurality of market makers.

17. A computer readable medium providing instructions for providing price validation for market makers in over the counter (OTC) markets, the instructions being executed on a computer and comprising:
accepting raw rates from price engines in a plurality of market makers, wherein the raw rates are bid and offer prices provided by the plurality of market makers;
aggregating the raw rates provided by the plurality of market makers;
inputting the raw rates to a price validation module;
calculating a bid base rate and an offer base rate based on the raw rates provided by the plurality of market makers;
validating a new bid or offer source rate by comparing the new bid or offer source rate provided by a first market maker with the corresponding bid or offer base rate, wherein the new bid or offer source rate is valid when a unilateral difference between the new bid or offer source rate and the corresponding bid or offer base rate is less than or equal to a first configurable tolerance, and wherein the unilateral difference is an amount that the new bid source rate is greater than the bid base rate or an amount that the new offer source rate is less than the offer base rate;
adding the validated new source bid or offer rate to a group of one or more validated rates; and
inputting the validated rates into a matching engine, wherein the matching engine matches the validated rates with orders from customers.

18. The computer readable medium of claim 17, further comprising instructions for removing an old source rate provided by the first market maker from the validated rates.

19. The computer readable medium of claim 17, further comprising instructions for sending an alert message to the first market maker if the new bid or offer source rate is not added to the validated rates.

20. The computer readable medium of claim 17, further comprising instructions for:
comparing an old bid or offer cache rate provided by a second market maker with the corresponding bid or offer base rate, wherein the old bid or offer cache rate is stored in a memory of the price validation module; and if a unilateral difference between the old bid or offer cache rate and the corresponding bid or offer base rate is more than a second configurable tolerance, removing the old bid or offer cache rate from the validated rates, wherein the unilateral difference is an amount that the old bid cache rate is greater than the bid base rate or an amount that the old offer cache rate is less than the offer base rate.

21. The computer readable medium of claim 17, wherein the instructions for calculating include instructions for calculating the bid base rate and the offer base rate based on actual trading prices that took place during a certain period, wherein the actual trading prices are stored in the matching engine.

22. The computer readable medium of claim 17, wherein the instructions for calculating include instructions for calculating an average of bid and offer prices provided by the plurality of market makers.

* * * * *